United States Patent [19]
Jones

[11] Patent Number: 5,691,052
[45] Date of Patent: Nov. 25, 1997

[54] POLYMERIC COMPOSITIONS WITH HIGH SELF-ADHESION AND PACKAGING MATERIALS AND PACKAGES MADE THEREFROM

[75] Inventor: Gregory K. Jones, Appleton, Wis.

[73] Assignee: American National Can Company, Chicago, Ill.

[21] Appl. No.: 486,435

[22] Filed: Jun. 7, 1995

[51] Int. Cl.$^6$ .................................. C09J 3/14; B32B 7/12
[52] U.S. Cl. ................................... 428/355; 428/349
[58] Field of Search ........................... 428/355, 354, 428/347, 516, 349; 524/314

[56] References Cited

U.S. PATENT DOCUMENTS

| | | |
|---|---|---|
| 3,630,980 | 12/1971 | Russell . |
| 4,102,835 | 7/1978 | Freeman et al. . |
| 4,102,854 | 7/1978 | Gergen et al. . |
| 4,111,894 | 9/1978 | Gergen et al. . |
| 4,111,895 | 9/1978 | Gergen et al. . |
| 4,126,600 | 11/1978 | Gergen et al. . |
| 4,173,597 | 11/1979 | Willcox et al. . |
| 4,197,377 | 4/1980 | Bohm et al. . |
| 4,386,125 | 5/1983 | Shiraki et al. . |
| 4,479,989 | 10/1984 | Mahal . |
| 4,525,533 | 6/1985 | Bertrand et al. . |
| 4,673,601 | 6/1987 | Lamping et al. ................... 428/349 X |
| 4,778,703 | 10/1988 | Fontanilla . |
| 4,843,125 | 6/1989 | Kawamura et al. . |
| 4,859,521 | 8/1989 | Pike et al. ........................... 428/349 X |
| 4,902,370 | 2/1990 | Dust et al. ................................... 156/327 |
| 4,997,014 | 3/1991 | Mitchell et al. . |
| 5,013,790 | 5/1991 | Tung et al. . |
| 5,070,164 | 12/1991 | Min et al. ............................... 526/286 |
| 5,086,109 | 2/1992 | Ueno et al. . |
| 5,106,917 | 4/1992 | Lee et al. . |
| 5,141,793 | 8/1992 | Fontanilla . |
| 5,151,309 | 9/1992 | Dollinger . |
| 5,198,496 | 3/1993 | Alvarez et al. . |
| 5,232,987 | 8/1993 | Sakakibara et al. . |
| 5,248,367 | 9/1993 | Minnick et al. . |
| 5,248,368 | 9/1993 | Minnick et al. . |
| 5,274,036 | 12/1993 | Korpman et al. . |
| 5,320,899 | 6/1994 | Djiauw . |
| 5,331,048 | 7/1994 | Hasselbring . |
| 5,356,994 | 10/1994 | Koch . |
| 5,412,035 | 5/1995 | Schmitt et al. . |
| 5,482,780 | 1/1996 | Wilkie et al. ....................... 428/331 X |
| 5,486,426 | 1/1996 | McGee et al. ...................... 428/354 X |

*Primary Examiner*—Daniel Zirker
*Attorney, Agent, or Firm*—Mary J. Schnurr, Esq.

[57] ABSTRACT

The invention relates to a polymeric composition which acts as an improved cold seal mechanism over prior art cold seal structures. The composition comprises a blend of 40% to 80% by weight of a tacky adhesive and 60% to 20% by weight of a lower viscosity, non-tacky resin. The composition has a seal strength of at least 0.2 lbs per inch when sealed to itself at a temperature of less than 120° F., and can be formed into a film for subsequent use in packaging.

31 Claims, 5 Drawing Sheets

POLYMERIC COMPOSITIONS WITH HIGH SELF-ADHESION AND PACKAGING MATERIALS AND PACKAGES MADE THEREFROM

BACKGROUND OF THE INVENTION

This invention relates to the field of polymeric films, and packages made therefrom, for packaging a variety of products, particularly food.

Generally, packages are formed in packaging machines in which the material or film is sealed to itself, such as by heated sealing jaws or otherwise by the application of heat.

This invention is directed to the field of a flexible packaging material that is sealable to itself by the application of pressure or force alone. This type of a sealing mechanism is known in the art as a "cold seal."

There are significant problems with prior art cold seal compositions. These problems lead to increased costs associated with the formation and use of cold seal mechanisms based on the prior art, and restrict the usefulness of packaging materials with prior art compositions on certain types of packaging equipment.

Prior art cold seal mechanisms require an additional step of manufacture for the production of a coating of the cold seal composition on the substrate or packaging film.

In addition, many prior art cold seal compositions, when subject to machining or packaging operations, rub off the substrate or film to which the compositions are attached. For example, during packaging operations with forming collars or shoulders, such as present on vertical-form-fill-seal equipment, cold seal compositions attached to packaging films often rub off. This leaves a residue on the packaging equipment, and could require greater maintenance of the packaging equipment and a loss of sealability of the packaging film.

It has now been discovered that a thermoplastic composition, comprising a tacky adhesive blended with a non-tacky resin having a lower viscosity than the tacky adhesive, acts as an effective cold seal mechanism for use with thermoplastic films and packages made therefrom.

The composition of the invention is coextrudable on standard plastics processing equipment suitable for the production of flexible packaging films. As a result, the extra step of manufacture common in the prior art to apply the cold seal to the substrate is not needed if the substrate is also coextrudable.

The thermoplastic composition of the invention has improved seal strength over prior art cold seal mechanisms. In addition, the thermoplastic composition of the invention is not subject to rubbing off during machining, nor is it subject to other types of failure during machining. Hence, there are significant cost savings associated with the use of the composition of the invention.

SUMMARY OF THE INVENTION

This invention is directed to a polymeric composition which acts as an improved cold seal mechanism over prior art cold seal structures, for use with polymeric films or substrates and packages made therefrom. The composition is superior over prior art cold seal structures in that it is not generally subject to failure during the machining or the packaging process. Hence, the composition of the invention has reduced costs of machining or packaging over the prior art.

In addition, the composition of the invention is coextrudable on standard plastics processing equipment suitable for the production of plastic packaging films. As a result, it is not necessary to have an extra step in the manufacturing process involving the application of the cold seal mechanism.

The composition is also superior over prior art cold seal structures in that it has increased seal strength.

The composition of the invention comprises a polymeric blend of 40% to 80% by weight of a tacky adhesive, and 60% to 20% by weight of a lower viscosity, non-tacky resin. The composition of the invention is generally formed into a film for subsequent use in packaging.

The composition of the invention is able to seal to itself at a seal strength of at least 0.2 lbs. per inch, at a temperature of less than 120° F.

In a first application, the film is used as a sealant layer having a cold seal mechanism for a multilayer polymeric film used in packaging. The film of the composition may be coextruded with additional layers of the multilayer film, or may be laminated onto additional layers of the multilayer film. In this application the composition has a preferred blend structure of 55% to 60% by weight of tacky adhesive and 45% to 40% by weight of non-tacky resin.

The composition of the invention is particularly useful when used as a sealant layer with coextruded films, particularly coextruded films that are subject to stretching or orientation after coextrusion. One such example are films containing oriented polypropylene (OPP).

In a second application, the coextruded film of the composition may be further processed into an elongated tape or into strips. As in the first application, the film used in this application may also be stretched or orientated after coextrusion. The strips or tape may then be heat sealed, laminated or otherwise attached to a base multilayer polymeric film or other substrate, and used to create a reclosable package with a cold seal mechanism. Generally the tape or strips will be multilayered structures that can be heat sealed or attached to two parts of the substrate or film, and the strips will be brought into contact to create a cold seal mechanism. In this second application, the cold seal mechanism is reclosable, i.e. the seal may be opened and subsequently reclosed.

In this application the preferred blend of the composition of the invention is 65% to 70% of a tacky adhesive and 35% to 30% of a lower viscosity, non-tacky resin of this application.

In a preferred embodiment of this application, the blend of the composition of the invention is formed as one layer of a multilayer strip. For example, the strip may contain a core layer of a polymer such as high density polyethylene ("HDPE"), or a similar polymer that has good qualities of tensile strength. The core layer is disposed in contact with the layer of the composition of the invention. An additional layer, which serves as the heat sealant layer, is disposed in contact with the side of the core layer opposite from the side disposed in contact with the layer of the composition of the invention. The heat sealant layer attaches the multilayer strip to the base multilayer polymeric film. The heat sealant layer may comprise any of the various polymers or copolymers commonly used in sealant layers, such as ethylene vinyl acetate ("EVA") or ionomers, ethylene methyl acrylate ("EMA"), high density polyethylene ("HDPE") or copolymers thereof.

DETAILED DESCRIPTION OF THE INVENTION

The invention consists of a composition for use with polymeric films or other substrates as a cold seal mechanism. In a first application, the composition of the invention may be used as a sealant layer, having a cold seal mechanism, for a multilayer polymeric film. The composition of the invention is able to seal to itself at a seal strength of at least 0.2 lbs. per inch at a temperature of less than 120° F.

Figure 1:
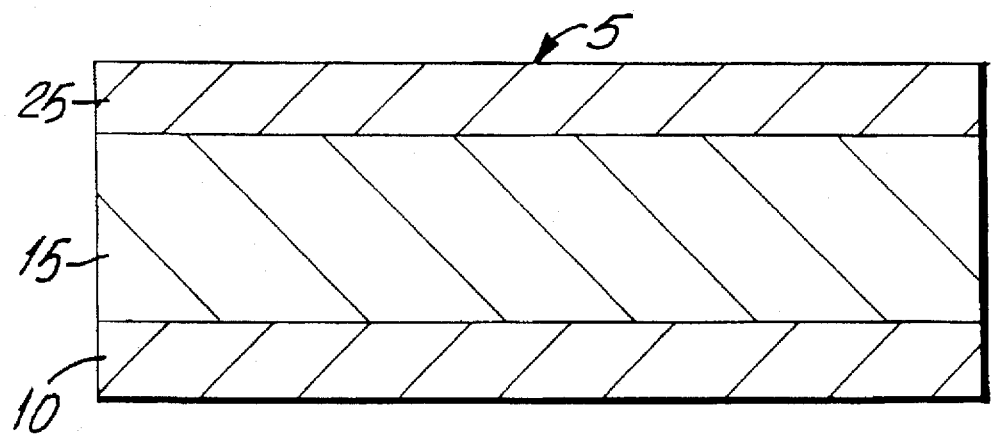
FIG. 1 depicts a multilayer polymeric film with a cold seal mechanism.
Figure 2:
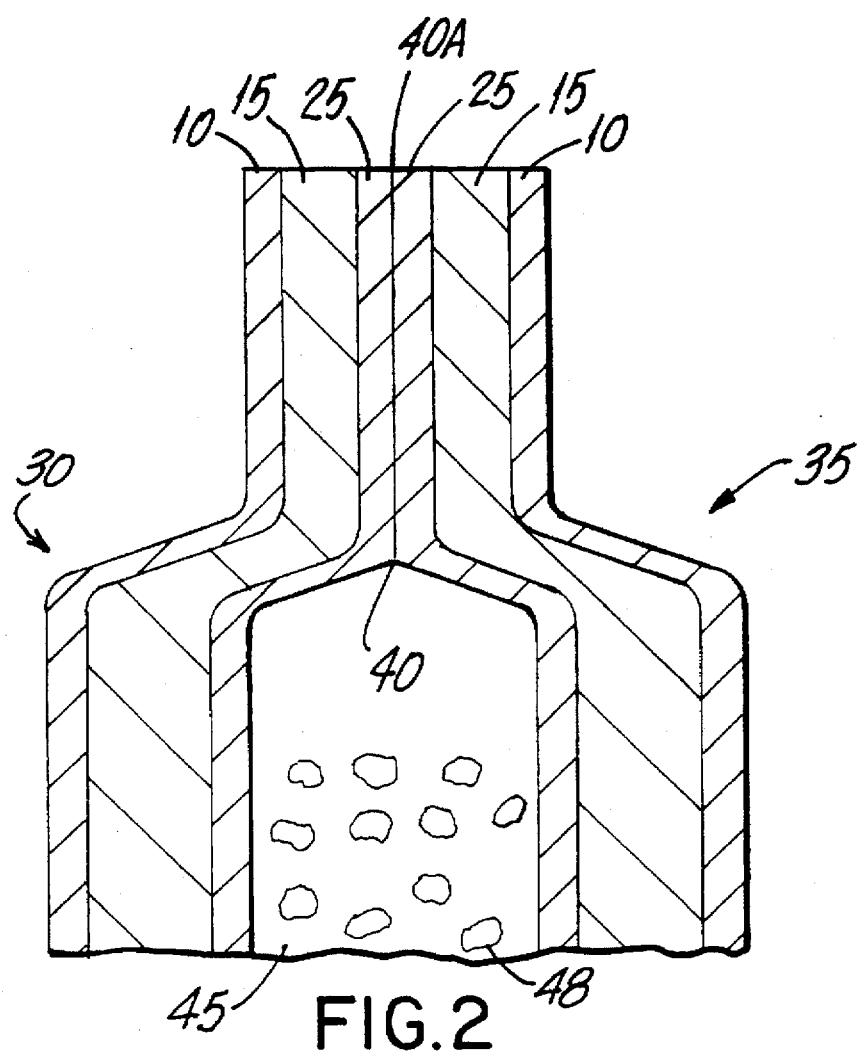
FIG. 2 depicts a package made from a multilayer polymeric film, with a sealed cold seal mechanism of the invention.
Figure 3:
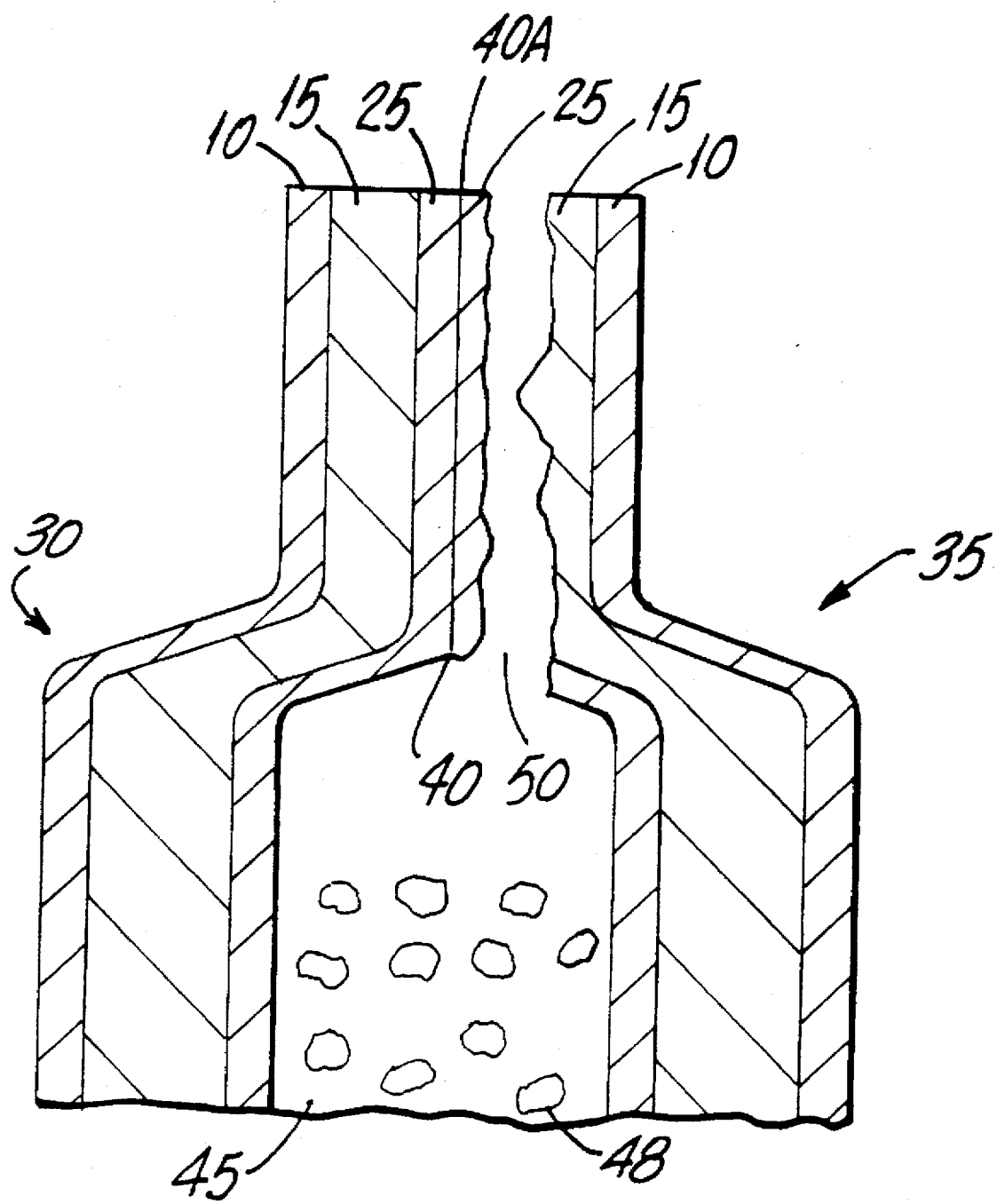
FIG. 3 depicts an opened package made from a multilayer polymeric film with a cold seal mechanism of the invention.

FIGS. 1 to 3 depict the composition of the invention in its first application, in the form of a sealant layer for multilayer polymeric films.

FIG. 1 is an example of a three layer polymeric film in which the composition of the invention is used as a sealant layer 25. The film itself may be any of the multitude of multilayer polymeric films that are found in the prior art. One such film in which the composition of the invention may be used is film 5 depicted in FIG. 1.

Layer 25 is made from the composition of the invention, and is able to seal to itself with the application of pressure. Layer 25 comprises a blend of 40% to 80% by weight of a tacky adhesive and 60% to 20% by weight of a non-tacky resin.

In a preferred embodiment, layer 25 comprises a blend of 50% to 70% by weight of a tacky adhesive, and 50% to 30% by weight of a lower viscosity, non-tacky resin. A most preferred range for the blend is 55% to 60% by weight of a tacky adhesive and 45% to 40% by weight of a lower viscosity, non-tacky resin.

The tacky resin adhesive may be any of several tacky adhesives that are used in the art of making polymeric films. One such adhesive is a styrene olefin block polymer, manufactured by Findley Adhesives, Inc. as M-3062. The M-3062 is a pressure sensitive styrene-isoprene blend copolymer, and is a hot melt adhesive extrudable at 380° F., with a melt index of 5.

The non-tacky resin suitable for blending with a tacky adhesive in the composition of the invention must have a lower viscosity than the tacky adhesive. Preferably, the viscosity of the non-tacky resin, when measured at a shear rate similar to those encountered during extrusion operations, will be lower than the tacky adhesive by one and a half to six times.

An example of a non-tacky adhesive suitable for use in either application of the invention is ethylene acrylic acid, or EAA. An alternative compound that may be used in the blend is ethylene vinyl acetate, or EVA. It is believed that there is no inherent advantage due to the structure of the non-tacky resin as regards its use in the composition of the invention. Rather, it is believed that any number of non-tacky resins having a viscosity one and a half to six times lower than the viscosity of the tacky adhesive, when viscosity is measured at a shear rate similar to that encountered during extrusion operations, are suitable.

In addition to the tacky adhesive and non-tacky resin, the composition of the invention may also comprise any of the various additives that are commonly added to polymeric films. One such additive that is contemplated in the composition of the invention is an antiblocking agent.

Disposed in contact with layer 25 is layer 15, the core layer of the multilayer film 5. Layer 15 may comprise any of various polymers that are commonly used, such as a white polypropylene concentrate and copolymers of white polypropylene concentrate. Layer 15 may alternatively comprise a blend of polymers including white polypropylene concentrate. Layer 10 may also comprise any of various polymers that are commonly used, such as a polypropylene or polypropylene copolymers. Layer 10 may alternatively comprise a blend of polymers including polypropylene.

Layers 25, 15 and 10 of multilayer film 5 may be of various thicknesses. In a preferred embodiment depicted in FIG. 1, layer 25 has a thickness of between 5% to 15% of the thickness of the film, layer 15 has a thickness of between 65% to 75% of the thickness of the film, and layer 10 has a thickness of between 15% to 25% of the thickness of the film.

FIG. 2 depicts a package, made from the multilayer film of FIG. 1, demonstrating the cold seal mechanism of the composition of the invention. FIG. 2 shows two films 30 and 35, of the type depicted in FIG. 1, brought into face to face contact and sealed at point 40 at the intersection of sealant layers 25 of the composition of the invention. The films 30 and 35 are sealed at sealant layers 25 by the application of pressure, such as the application of pressure associated with a cold seal sealing machine of the type commonly used in the machining or packaging of packages made from polymeric films.

Depicted at a point 45 is the interior of the sealed package made from polymeric films 30 and 35 and sealed at points 40 through 40A with the cold seal mechanism of the invention. Product 48 is stored inside the package at point 45. Product 48 may be any of the multitude of consumer products commonly stored in packages made from polymeric films, including various types of food products.

As in FIG. 1, in addition to the sealant layer 25 of the composition of the invention, films 30 and 35 of FIG. 2 have a layer 15 of white polypropylene concentrate or a blend thereof, and layer 10 of a polypropylene or blend thereof.

FIG. 3 also depicts the package of FIG. 2, made from the multilayer films 30 and 35 of the type depicted in FIG. 1, and sealed at points 40 through 40A at the intersection of sealant layers 25 of the composition of the invention. FIG. 3 depicts the package at a later point in time, after it has been opened, such as would be done by a consumer in the process of obtaining access to the product 48. As shown in FIG. 3, the consumer tears through the film at a point different than the point of the cold seal mechanism 40 through 40A. The film will not separate at the point of the cold seal mechanism 40. The consumer is then able to obtain access to the inside 45 of the package, and the product 48 contained therein.

It is apparent that in its first application, the composition of the invention may also be used as a sealant layer in two multilayer films or webs of different structures. In this manner the composition of the invention may form a cold seal mechanism between two films of differing structures.

FIGS. 4 to 8 depict the composition of the invention is its second application, as a strip for use in various applications, including polymeric films and packages made therefrom.

Figure 4:
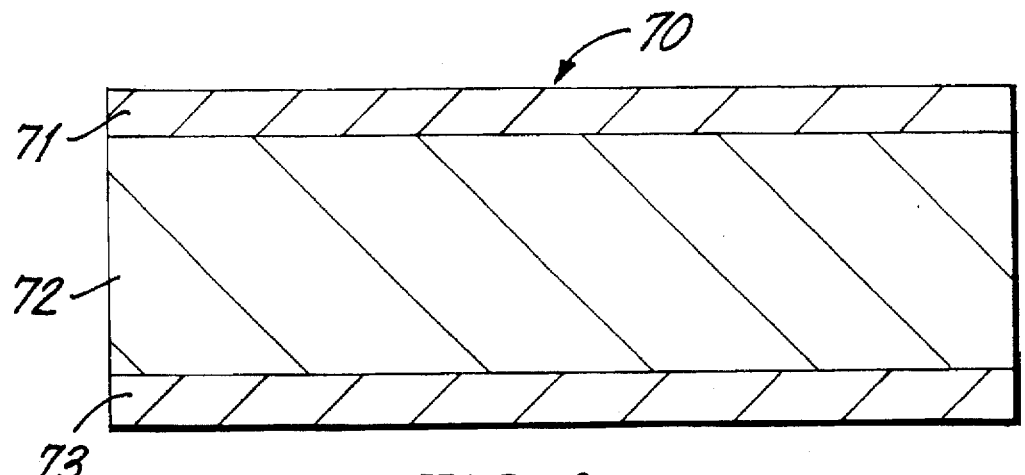
FIG. 4 depicts the composition of the invention in the form of a laminate or strip.

FIG. 4 depicts the composition of the invention in the form of strip 70. Strip 70 has layers 71, 72 and 73.

Layer 71 is the composition of the invention, and comprises a blend of 40% to 80% by weight of a tacky adhesive and 60% to 20% by weight of non-tacky resin. In a preferred embodiment, layer 71 comprises a blend of 50% to 70% by weight of a tacky adhesive, and 50% to 30% by weight of a lower viscosity, non-tacky resin. A most preferred range for the blend is 65% to 70% of a tacky adhesive and 35% to 30% of a lower viscosity, non-tacky resin.

Layer 71 may comprise any of several tacky adhesives that are used in the art of making polymeric films, such as the aforementioned M-3062 manufactured by Findley Adhesives. The non-tacky resin suitable for layer 71 may be any of the various non-tacky resins that have a viscosity one and a half to six times lower than that of the non-tacky resin, where viscosity is measured at a shear rate similar to that encountered during extrusion operators. Examples of such resins are EAA and EVA.

Layer 72, which is disposed in contact with layer 71, may be any of various polymers that have a relatively high degree of tensile strength. One such polymer is a high density polyethylene ("HDPE"), copolymers of HDPE, or a blend thereof. Layer 73 comprises any of various polymers that may be an effective sealant layer, such as an EVA, ionomers, EMA, HDPE, or copolymers thereof. The following are some of the polymers or copolymers that may be used in the heat sealant layer 73: Surlyn 1652-52, manufactured by E.I. duPont deNemours; EMA 2205, manufactured by Chevron Chemical; HDPE LM 6180, manufactured by Quantum Chemical Co.; and LDPE L55-14, manufactured by Consolidated Thermoplastics, Inc.

Figure 5:
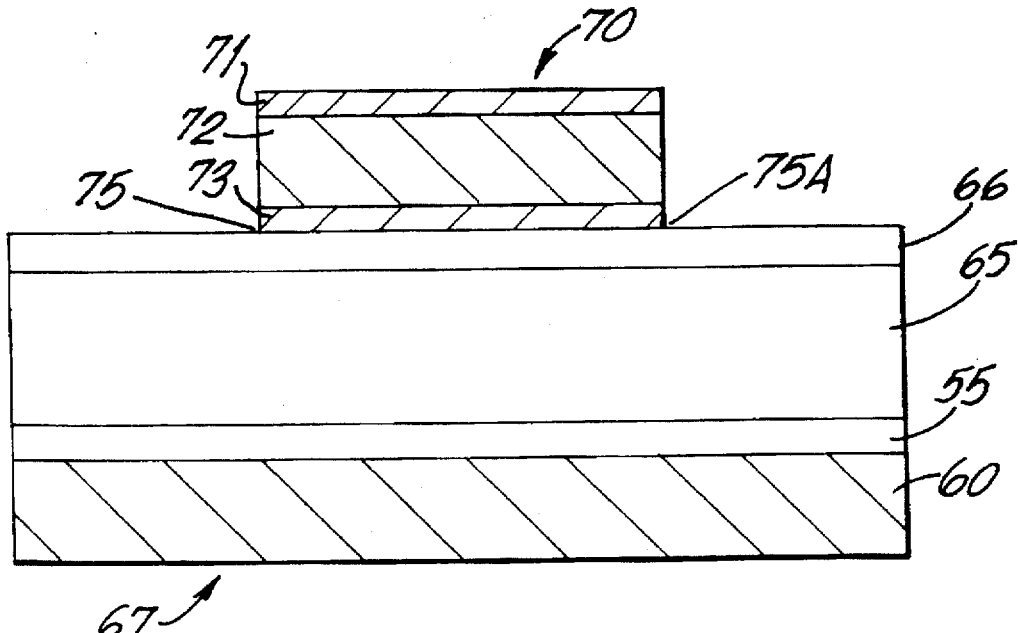
FIG. 5 depicts a multilayer polymeric film with a strip of the composition of the invention.

FIG. 5 depicts the laminate or strip 70 which has been attached to a multilayer polymeric film 67. The strip 70 is attached to the polymeric film 67 at points 75 through 75A by heat sealing layer 73 of the strip to the multilayer polymeric film. Alternatively, the strip may be attached at points 75 through 75A by any of the alternative methods common in the art of making polymeric films, such as by lamination or use of an adhesive.

The film 67 can be any of the many types of polymeric films commonly used in the field of packaging consumer products. Typically, these types of films will be multilayer polymeric films of the type 67. Film 67 is a four layer film having a layer 60 of a polymer such as polyethylene terephthalate ("PET") disposed in contact with the strip 70 of the composition of the invention. Disposed in contact with layer 60 is layer 55 of an adhesive. Disposed in contact with adhesive layer 55 is layer 65 of a polymer such as LLDPE. Disposed in contact with layer 65 of LLDPE is layer 66 of a sealant, such as an EVA.

The preferred ranges of thickness of various layers of the film 67 are 0.45 to 0.55 mils for layer 60 of PET, 0.05 to 0.15 mils for layer 55 of an adhesive, 1.40 to 1.60 mils for layer 65 of LLDPE, and 0.40 to 0.60 mils for layer 66 of a sealant.

Figure 6:
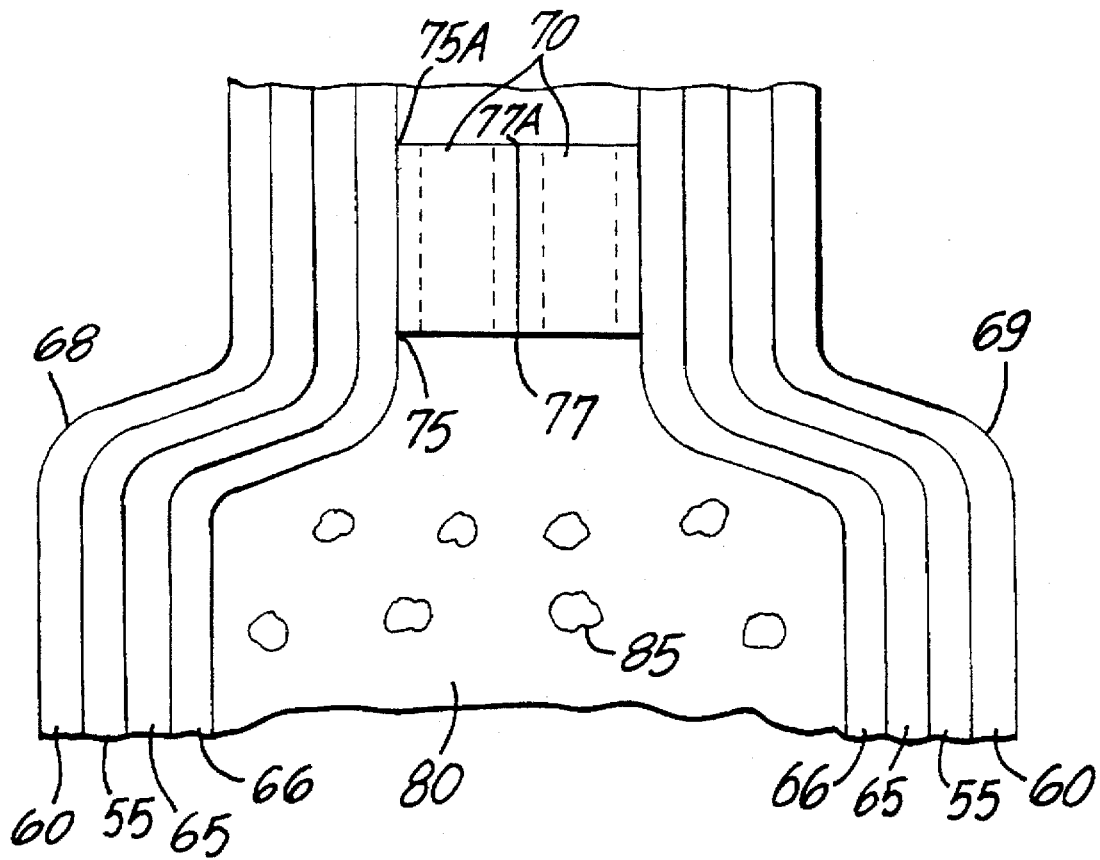
FIG. 6 depicts a package made from a multilayer polymeric film with a sealed cold seal mechanism of the invention.

FIG. 6 depicts a sealed package, made from the film of FIG. 5 with the strip containing the composition of the invention, demonstrating the cold seal mechanism of the composition of the invention. FIG. 6 shows two films 68 and 69 of the type depicted in FIG. 5, each having strips of the composition of the invention 70 attached to the film at point 75 through 75A and 76 through 76A. The strips 70 of the films 68 and 69 are brought into face to face contact at points 77 through 77A and sealed by the application of force, such as by the application of force associated with a human hand. Depicted at point 80 is the interior of the sealed package made from polymeric films 68 and 69 and sealed at point 77 with the cold seal mechanism of the invention. Product 85 is stored inside the package at point 80. Product 85 may be any of the multitude of consumer products commonly stored in packages made from polymeric films, including various types of food products.

As in FIG. 5, films 67 and 69 have layers 60 of PET, layers 55 of an adhesive, layers 65 of a LLDPE, and layers 66 of an EVA.

Figure 7:
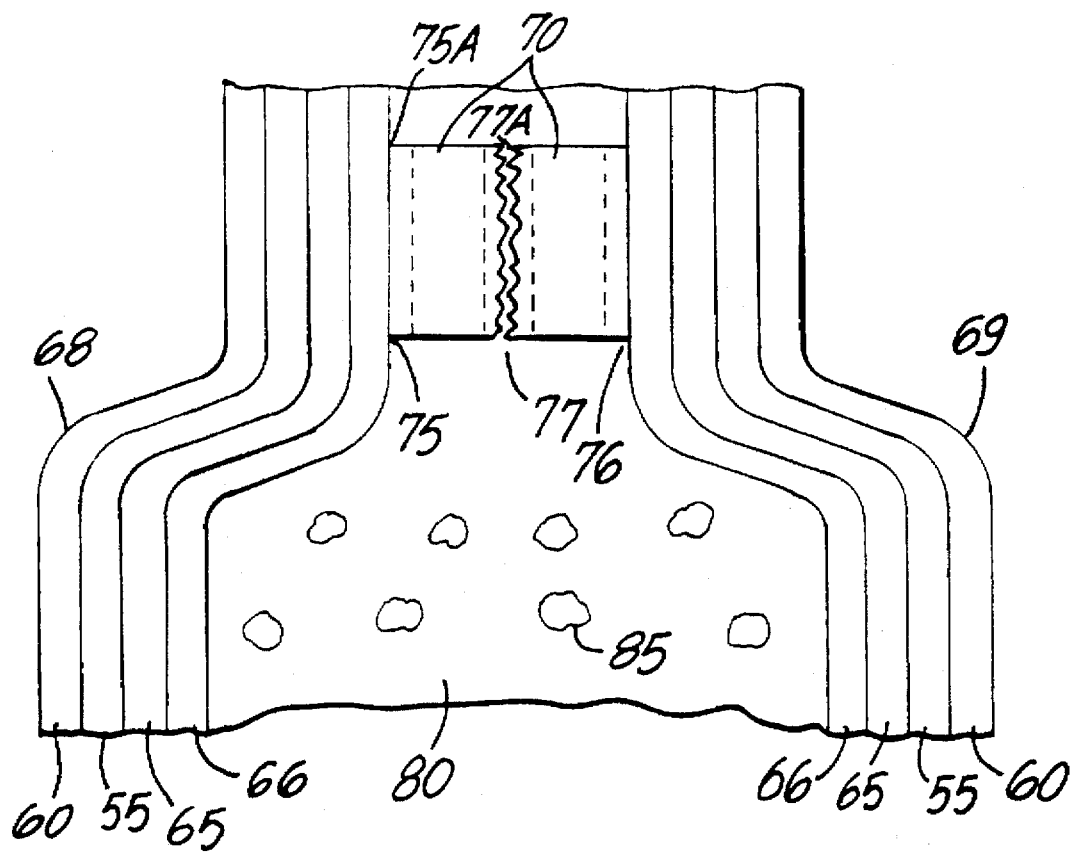
FIG. 7 depicts a package made from a multilayer polymeric film with an opened cold seal mechanism of the invention.

FIG. 7 depicts the package of FIG. 6, also made from the polymeric films 68 and 69, each containing the laminate of strip 70 of the composition of the invention. FIG. 7 depicts the package at a later point in time, after it has been opened, such as would be done by a consumer applying the force associated with a human hand in the process of obtaining access to the product 48. As shown in FIG. 7, the seal will break at points 77 through 77A, allowing the consumer access to the product. After the consumer has had access to the product, the film may then be reclosed at point 77 through 77A by reattaching strips 70.

It is apparent that in its second application, the composition of the invention may also be used as a sealant layer in films or webs of different structures. In this manner the composition of the invention may form a cold seal mechanism between two films of differing structures.

In addition to their use in connection with cold seal mechanisms for polymeric films as depicted in FIGS. 5 through 7, the strip 70 depicted in FIG. 4 may be used to form cold seal mechanisms with a variety of substrates, including paper products, cardboard, or other types of plastics.

Figure 8:
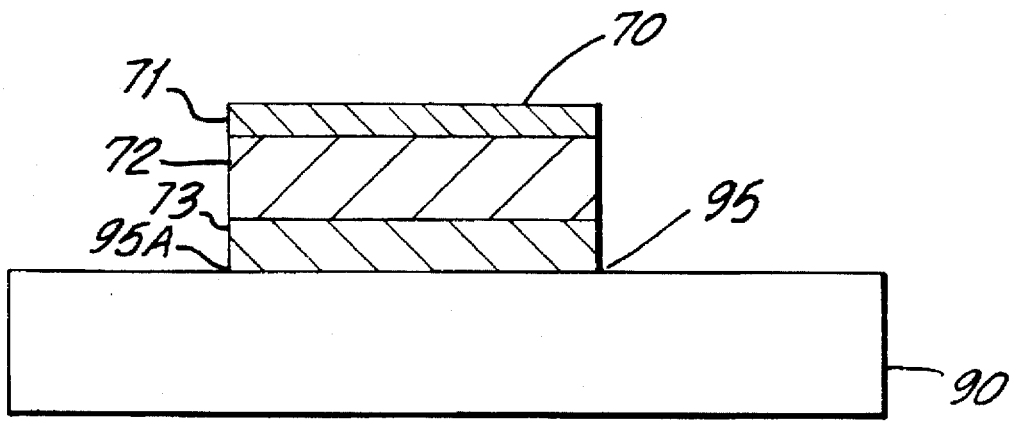
FIG. 8 depicts a substrate with a strip of the composition of the invention.

As shown in FIG. 8, in connection with these substrates, layer 73 of the strip 70 may be attached to the substrate 90 at point 95 through 95A by heat sealing or through any of the alternative methods common in the art, such as through lamination or through use of an adhesive. When brought into contact with an additional strip of the composition of the invention, the cold seal mechanism of the invention may be formed. It is apparent that in this manner the composition of the invention may be used to form a cold seal mechanism between two different structures, such as between a substrate and a polymeric film, or between two different substrates.

EXAMPLES

Samples of the composition of the invention used in its first application, where the composition of the invention is used as a sealant layer in multilayer polymeric films, have been constructed. Samples of three layer films were coextruded, each using a sealant layer of the composition of the invention. In each of the films, the film has a base layer of polypropylene, a core layer of white polypropylene, and a sealant layer of the composition of the invention. The base layer of polypropylene was 20% of the thickness of the films, the core layer of white polypropylene was 70% of the thickness of the films, and the sealant layer of the composition was 10% of the thickness of the films.

In the first group of sample films, the sealant layer was a blend of 70% by weight of the tacky adhesive M 3062, manufactured by Findley Adhesives, Inc. and 30% by weight of an EAA. The EAA resin used was Primacor 3460, manufactured by Dow Chemical Co. The film was moderately tacky and was measured at a Sentinel seal strength of 2.15 lbs./inch.

In a second group of samples, the sealant layer was a blend of 60% by weight of the tacky adhesive M 3062, manufactured by Findley Adhesives, Inc. and 30% by weight of an EAA. The blend also contained 10% by weight of antiblocking agent Conpol 20B, manufactured by DuPont Chemical Company. Conpol 20B is a resin containing 20,000 ppm of an antiblocking agent in an EMAA carrier resin. The second group of samples were measured at a Sentinel strength of 1.75 lbs./inch.

The second group of samples were found to perform particularly well, and to have good machinability. The seals were of sufficient strength such that packages made from the samples could not be opened at the seals, but rather were opened by tearing through the package, as depicted in FIG. 3.

The foregoing examples are representative of the types of films that may be made with the composition of the invention in its first application. These examples are not intended to demonstrate the only films that may be made with the composition of the invention.

Further modifications of the invention will be apparent to those skilled in the art and all such modifications are deemed to be within the scope of the invention as defined in the following claims.

Having thus described the invention, what is claimed is:

1. An extrudable polymeric composition comprising a blend of 40% to 80% by weight of a tacky adhesive and 60% to 20% by weight of a non-tacky resin, said composition having a seal strength of at least 0.2 lbs. per inch when sealed to itself at a temperature of less than 120° F.

2. A coextruded polymeric film having at least one layer comprising the composition of claim 1.

3. The polymeric film of claim 2 wherein the tacky adhesive comprises a styrene block copolymer.

4. The polymeric film of claim 2 wherein the non-tacky resin is ethylene acrylic acid.

5. The polymeric film of claim 2, wherein at least one layer comprises polypropylene.

6. The polymeric film of claim 2, said film being oriented.

7. A coextruded elongated, multilayer strip, said strip having at least one layer comprising the composition of claim 1.

8. A package including an elongated, multilayer strip as in claim 3.

9. A package including a polymeric film as in claim 7.

10. A coextruded multilayer, polymeric film as in claim 5, said film being cut into an elongated strip.

11. A coextruded multilayer, polymeric film as in claim 10, said film further comprising a layer of HDPE.

12. A coextruded multilayer, polymeric film as in claim 10, said film further comprising a second layer capable of forming a heat seal.

13. A coextruded multilayer, polymeric film as in claim 10, said layer capable of forming a heat seal comprising a compound selected from the group consisting of ethylene acrylic acid and an ionomer.

14. The composition of claim 1 wherein the composition further comprises an antiblocking agent.

15. A coextruded multilayer, polymeric film having a sealant layer comprising a blend of 40% to 80% by weight of a tacky adhesive and 60% to 20% by weight of a non-tacky resin, said non-tacky resin having a viscosity at least one and a half times less than the viscosity of the tacky adhesive, said viscosity being measured at a shear rate similar to the shear rate encountered during extrusion, said sealant layer being capable of forming a cold seal bond.

16. A coextruded multilayer, polymeric film as in claim 15, wherein said tacky adhesive comprises a styrene-isoprene copolymer.

17. A coextruded multilayer, polymeric film as in claim 15, wherein said non-tacky resin comprises ethylene acrylic acid.

18. A coextruded multilayer, polymeric film as in claim 15, said sealant layer further comprising an antiblocking agent.

19. A package including multilayer polymer film as in claim 15.

20. The composition of claim 1 wherein the blend comprises 40% to 80% by weight of the tacky adhesive and 60% to 20% by weight of the non-tacky resin.

21. The multilayer, polymeric film of claim 15 wherein the blend comprises 40% to 80% by weight of the tacky adhesive and 60% to 20% by weight of the non-tacky resin.

22. The package of claim 8 wherein a first film having a first elongated, multilayer strip is attached to a second film having a second elongated, multi-layer strip, forming a cold seal mechanism.

23. The package of claim 22 wherein the package can be opened at the point of the cold seal mechanism by the application of manual force.

24. The package of claim 23 wherein the package may be reclosed at the point of the cold seal mechanism.

25. An extrudable polymeric composition comprising a blend of:

(a) 40% to 80% by weight of a tacky adhesive styrene-isoprene copolymer;

(b) 60% to 20% by weight of a non-tacky resin; wherein said non-tacky resin has a viscosity at least one and a half times less than the viscosity of the tacky adhesive, said viscosity being measured at a shear rate similar to the shear rate encountered during extrusion.

26. An extrudable polymeric composition as in claim 25, wherein said styrene-isoprene copolymer is extrudable at 380° F.

27. An extrudable polymeric composition as in claim 23, wherein said styrene-isoprene copolymer has a melt index of about 5.

28. An extrudable polymeric composition as in claims 26 or 27, wherein said non-tacky adhesive is selected from the group consisting of ethylene acrylic acid and ethylene vinyl acetate.

29. A coextruded multilayer polymeric film comprising:

(a) a first sealant layer, said first layer comprising a blend of 40% to 80% by weight of said blend of a tacky adhesive styrene-isoprene copolymer and 60% to 20% by weight of said blend of a non-tacky resin;

(b) a second core layer, said second layer disposed in surface-to-surface contact with said first layer, said second layer comprising white polypropylene; and (c) a third layer, said third layer disposed in surface-to-surface contact with said second layer, said third layer comprising polypropylene.

30. A coextruded, multilayer polymeric film as in claim 29, wherein said first layer comprises between 5 to 15% of the thickness of the film, said second layer comprises between 65 to 75% of the thickness of the film, and said third layer comprises between 15 to 25% of the thickness of the film.

31. A package made from the coextruded, multilayer polymeric film of claim 29.

* * * * *